United States Patent
Buzzard et al.

(10) Patent No.: US 9,862,412 B2
(45) Date of Patent: Jan. 9, 2018

(54) ELASTICALLY MOUNTED VIBRATION DAMPER FOR A SHAFT ASSEMBLY

(71) Applicant: STEERING SOLUTIONS IP HOLDING CORPORATION, Saginaw, MI (US)

(72) Inventors: Donald A. Buzzard, Saginaw, MI (US); Michael P. Anspaugh, Bay City, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 168 days.

(21) Appl. No.: 14/549,750

(22) Filed: Nov. 21, 2014

(65) Prior Publication Data

US 2016/0144892 A1  May 26, 2016

(51) Int. Cl.
*B62D 1/16* (2006.01)
*B62D 7/22* (2006.01)

(52) U.S. Cl.
CPC .................................. *B62D 7/224* (2013.01)

(58) Field of Classification Search
CPC ......... B62D 1/181; B62D 1/195; F16C 3/035; Y10T 74/2066
USPC ............................ 74/492, 493; 280/775, 777
See application file for complete search history.

(56) References Cited

U.S. PATENT DOCUMENTS

| | | | | |
|---|---|---|---|---|
| 3,877,319 A * | 4/1975 | Cooper | ................. | B62D 1/192 188/371 |
| 4,890,505 A * | 1/1990 | Kinoshita | .............. | B62D 1/184 74/493 |
| 5,590,565 A * | 1/1997 | Palfenier | ................ | B62D 1/181 74/493 |
| 5,720,496 A * | 2/1998 | Riefe | ..................... | B62D 1/195 188/371 |
| 5,758,545 A * | 6/1998 | Fevre | ..................... | B62D 1/185 280/775 |
| 6,019,391 A * | 2/2000 | Stuedemann | .......... | B62D 1/195 280/775 |
| 6,371,519 B1 * | 4/2002 | Jurik | ..................... | B62D 1/192 280/777 |
| 7,784,830 B2 * | 8/2010 | Ulintz | .................... | B62D 1/192 280/775 |
| 8,960,044 B2 * | 2/2015 | Nagasawa | .............. | B22D 19/04 280/775 |
| 2005/0262960 A1 * | 12/2005 | Cymbal | ................. | B62D 1/185 74/492 |
| 2007/0295549 A1 * | 12/2007 | Yoshioka | ............... | B62D 1/192 180/271 |
| 2009/0100956 A1 * | 4/2009 | Warashina | ............. | B62D 1/181 74/493 |
| 2010/0242663 A1 * | 9/2010 | Takezawa | .............. | B62D 1/184 74/493 |
| 2010/0307280 A1 * | 12/2010 | Schnitzer | ............... | B62D 1/185 74/493 |

* cited by examiner

*Primary Examiner* — Toan C To
(74) *Attorney, Agent, or Firm* — Cantor Colburn LLP

(57) ABSTRACT

In one aspect of the invention, a steering column assembly is provided. The assembly includes a tubular jacket having a first end and a second end, a steering shaft at least partially disposed within the tubular jacket, and an elastic vibration damper disposed between the steering shaft and the tubular jacket.

12 Claims, 2 Drawing Sheets

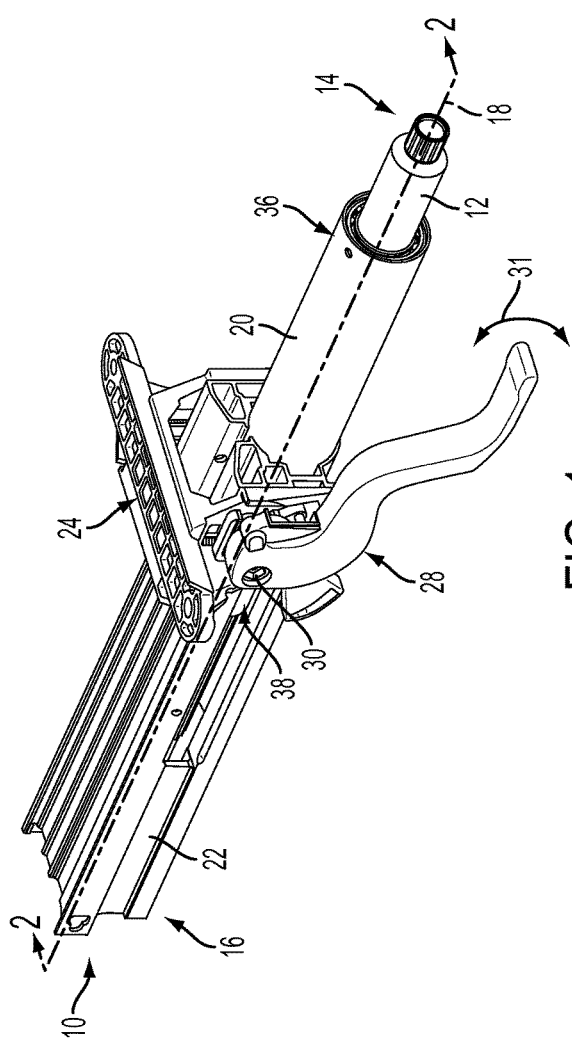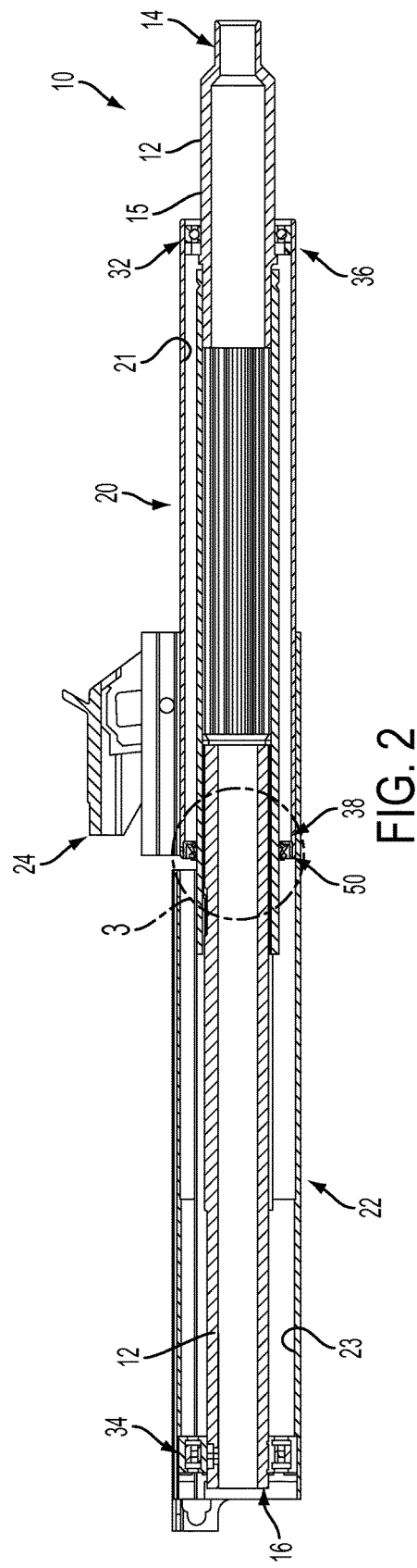

ELASTICALLY MOUNTED VIBRATION DAMPER FOR A SHAFT ASSEMBLY

FIELD OF THE INVENTION

The subject invention relates to vibration dampers and seals, and more particularly, to vibration dampers and seals for a steering column assembly.

BACKGROUND OF THE INVENTION

Some known steering column assemblies are configured such that when a driver rotates a steering wheel in a desired direction, a steering column shaft connected to the steering wheel is rotated, and an intermediate shaft transmits the rotary force of the steering shaft through a universal joint to a gear box, which may include a rack and pinion gear.

The gear box converts the rotational motion of the steering shaft into a rectilinear motion by the rack and pinion gear, and transmits the rectilinear motion to a rack bar. As such, the rack bar transmits the force to a tie rod connected to a tire knuckle such that the driving direction of the vehicle can be changed.

Some steering column assemblies utilize upper and lower bearings to rotatably support shafts within a steering column jacket. In some assemblies, a third bearing is added and/or a steering column structure is enhanced to achieve a required noise, vibration, harshness (NVH) and/or stiffness performance. However, a third bearing may cause undesirable high and low turning torque. However, assemblies without a third bearing or enhanced structure may experience increased noise and vibration generation and allow contaminants into the steering column assemblies. Accordingly, it is desirable to provide a steering column assembly with improved dampening, NVH, stiffness, and sealing performance, without causing undesirable high or low turning torque.

SUMMARY OF THE INVENTION

In one aspect of the invention, a steering column assembly is provided. The assembly includes a tubular jacket having a first end and a second end, a steering shaft at least partially disposed within the tubular jacket, and an elastic vibration damper disposed between the steering shaft and the tubular jacket.

In another aspect of the invention, a steering column assembly is provided. The assembly includes a tubular jacket having a first end and a second end, a steering shaft at least partially disposed within the tubular jacket, a non-bearing compliant structural member disposed between the steering shaft and the tubular jacket, the non-bearing compliant structural member configured to adjust a turning torque of the steering column assembly.

In yet another aspect of the invention, a method of assembling a steering column assembly is provided. The method includes providing a tubular jacket having a first end and a second end, providing a damper seal, and inserting the damper seal into the tubular jacket. The method further includes providing a steering shaft and inserting the steering shaft into the damper seal.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 1 is a perspective view of an exemplary steering column assembly in accordance with the invention;

FIG. 2 is a cross-sectional view of the assembly shown in FIG. 1 taken along line 2-2;

DETAILED DESCRIPTION

Figure 4:
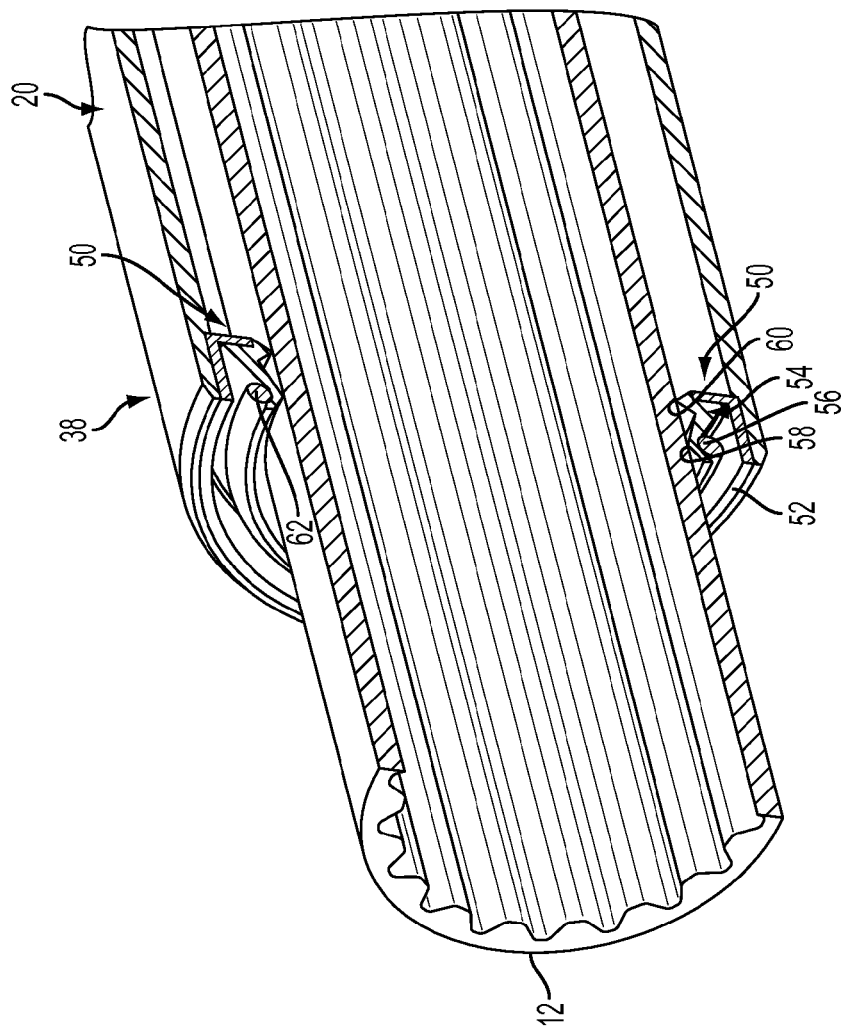
FIG. 4 is a perspective view taken in cross-section of a portion of the assembly shown in FIG. 2.

Described herein are systems and methods providing a compliant damper or seal with an outer case optionally including a pre-load tension biasing mechanism. The systems increase noise, vibration, harshness (NVH) performance and/or increase the stiffness of a shaft assembly (e.g., a steering column assembly). The systems improve performance when bending loads and/or vibrational inputs are applied to the steering column assembly. This may happen when a vehicle traverses a rough road, goes over a pothole, or other disturbances. The systems may also be used to control the level of turning torque of a steering shaft of the assembly. The performance improvements are accomplished while inducing a minimal amount of variation of steering shaft turning torque as compared to a system without the compliant damper of the invention.

Referring now to the Figures, where the invention will be described with reference to specific embodiments, without limiting same, FIGS. 1 and 2 illustrate an exemplary embodiment of a steering column assembly 10 for a vehicle. Although illustrated as a steering column assembly, the invention described herein may be used with any suitable shaft coupling.

In the exemplary embodiment, steering column assembly 10 generally includes a steering column shaft 12 having a first end 14 and a second end 16. Shaft first end 14 is configured to couple to a steering wheel (not shown) or other operator control, and column second end 16 is operably coupled to a steering system that translates rotational motion of shaft 12 about a column axis 18 into steering motion of the vehicle.

Steering column assembly 10 includes an upper jacket 20 and a lower jacket 22. As shown, upper jacket 20 extends from shaft first end 14 and extends at least partially within lower jacket 22, which extends from shaft second end 16 toward column first end 14. Motion of upper jacket 20 in lower jacket 22 along column axis 18 is a telescopic adjustment of steering column assembly 10. Alternatively, lower jacket 22 may be at least partially located or extend within upper jacket 20.

Lower jacket 22 is pivotally coupled to a mounting bracket or rake bracket 24 to facilitate adjusting a rake position of shaft 12 with an adjustment lever 28, which is coupled to a rake bolt 30 having one or more integral clamp cam members (not shown). When adjustment lever 28 is rotated to a secured position, as in FIG. 1, rake bolt 30 is rotated such that the cam members frictionally engage portions of shaft 12 to hold a rake position of shaft 12. When adjustment lever 28 is rotated to a released position in the direction of arrow 31, rake bolt 30 rotates such that the frictional engagement of the cam members to shaft 12 is released, thereby allowing a change in rake position of shaft 12.

As shown in FIG. 2, steering column assembly 10 includes an upper bearing 32 and a lower bearing 34. Upper bearing 32 is disposed annularly about the outer surface 15 of shaft first end 14 and is slidably engaged with the inner surface 21 of upper jacket 20. Lower bearing 34 is disposed annularly about the outer surface 15 of shaft second end 16 and is slidably engaged with the inner surface 23 of lower jacket 22.

In the exemplary embodiment, a damper seal 50 is disposed between shaft 12 and upper jacket 20. Damper seal 50 is a non-bearing compliant structural member or damper comprising elements as described herein. It is elastically mounted and can support shaft 12 in bending, as will be further described herein. For example, seal 50 may be press-fit into and within upper jacket 20, and shaft 12 is disposed within an inner circumference of the seal 50 and within upper jacket 20. As shown in FIG. 2, upper jacket 20 includes a first end 36 and a second end 38. Upper bearing 32 is disposed proximate upper jacket first end 36 and damper seal 50 is disposed proximate upper jacket second end 38. In this position, damper seal 50 facilitates preventing undue pivoting of upper jacket 20 about upper bearing 32 during bending of steering column shaft 12. Although illustrated with damper seal 50 positioned proximate jacket second end 38, damper seal 50 may be positioned between shaft 12 and upper jacket 20 at any suitable location between first end 36 and second end 38.

Figure 3:
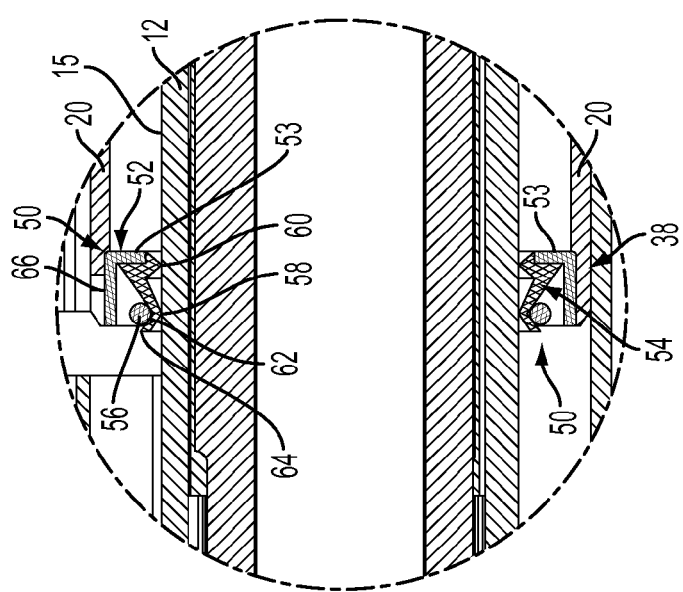
FIG. 3 is an enlarged cross-sectional view of the assembly shown in FIG. 2 taken along section 3.

With reference to FIGS. 3 and 4, in the exemplary embodiment, damper seal 50 generally includes a carrier portion 52 and a compliant seal portion 54. Damper seal 50 may optionally include a biasing mechanism 56 (e.g., a spring or compliant o-ring having elastic properties) as shown. Carrier portion 52 is fabricated from metal, plastic, or any suitable material and provides support for seal portion 54. Seal portion 54 is fabricated from a suitable compliant material such as rubber or other elastomeric material.

As shown in FIG. 3, seal portion 54 includes a sealing lip or edge 58, a dust lip or edge 60, a spring groove 62, and a spring lip 64. Sealing lip 58 contacts the outer surface 15 of shaft 12, and an outer surface 66 of carrier portion 52 contacts the inner surface 21 of upper jacket 20. However, because of the compliance and geometry, either the sealing lip 58 or dust lip 60 contacts or engage the entire outer circumference of outer surface 15. Instead, sealing lip engages outer surface 15 at one or more interrupted intervals about the perimeter of outer surface 15. This feature is tunable to allow the contact point(s) to be controlled. In this manner, effect on turning torque can be minimized. Dust lip 60 can be tuned in a similar manner.

Dust lip 60 contacts the outer surface of shaft 12 and facilitates preventing contaminants from passing thereby. Biasing mechanism 56 is seated within spring groove 62 and held in place by its own tension and at least in part by spring lip 64. Biasing mechanism 56 facilitates biasing sealing lip 58 and/or dust lip 60 against shaft 12 to create a seal between shaft 12 and upper jacket 20. Although illustrated with a single sealing lip 58 and dust lip 60, damper seal 54 may have any suitable number of lips 58, 60 that enables damper seal 50 to function as described herein. For example, damper seal 50 may have two or three lips 58. Moreover, damper seal 50 may have any suitable shape that enables assembly 10 to function as described herein.

Damper seal 50 is configured to increase NVH performance, stiffness of assembly 10, and/or adjust the turning torque of steering column assembly 10. One benefit of using damper seal 50 over a third bearing is the ability for seal 50 to flex to the variation in run-out of the shaft line axis 18. In one example, damper seal 50 is configured to allow in excess of 1 mm of steering shaft run-out, with turning torque variation below +/−0.03 Nm, while improving steering column NVH and stiffness performance.

Additionally, the shape and features of seal 50 (e.g., lips 58, 60 forming a "w" shape) may be variably designed to selectively adjust turning torque and/or turning NVH by increasing or decreasing the interference between shaft 12 and seal 50. This also enables seal 50 to facilitate minimizing variation in turning torque by flexing to run-out variation in the shaft line 18. As such, performance of assembly 10 can be tuned through seal material selection, seal geometry, biasing mechanism design, interference condition, lubricant, rotating surface control, or any combination thereof.

In one exemplary embodiment, damper seal 50 is configured to ground (i.e., engage) against shaft 12 during movement of shaft 12 (e.g., pushing or pulling movement). For example, carrier portion 52 may include a rigid (e.g. metal) lip 53 to contact and engage shaft 12 during a predetermined movement of shaft 12. Grounding of damper seal 50 allows for increased shaft stability and steering column structural stiffness.

A method of assembling steering column assembly 10 includes providing upper jacket 20, providing damper seal 50, and inserting damper seal 50 into upper jacket 20. Steering column shaft 12 is provided and inserted into damper seal 50 and upper jacket 20.

Systems and methods for controlling characteristics of a steering column assembly are provided herein. As described, damper seal 50 and assembly 10 may be used to shift turning torque of shaft 12 by adjustment of various design parameters such as amount of dimensional interference between the rotating member (e.g., shaft 12) and seal portion 54 interface, presence or absence of biasing mechanism 56, cross-section characteristics of seal 50 (number of lips 58, cantilever distance of contact point from carrier portion 52, cross-section thickness, etc.), material selection for seal 50 and shaft 12, and lubricant.

Further, damper seal 50 also improves noise performance of assembly 10 by blocking and/or insulating the noise path through assembly 10, acting as a baffle, to the front of the dash of a vehicle (not shown), defining the beginning of a passenger compartment, and by modification of the noise chamber inside upper and lower jackets 20, 22 outside shaft line 18. Damper seal 50 also facilitates controlling debris and contamination by limiting migration of debris between bearings 32, 34 and by blocking the dust/condensate path (i.e., the space between jackets 20, 22 and shaft line 18). Additionally, damper seal 50 improves NVH due to its location at a distance away from upper bearing 32, which acts as a pivot. Damper seal 50 is not a solid element, as would be a bearing. Damper seal 50 enhances the structure of assembly 10 without needing a solid element (e.g., third bearing), improves system natural frequency, improves system stiffness with loads applied at shaft first end 14, and the compliance of seal 50 allows for interference contact with shaft 12 and upper jacket 20 while being robust against tolerance variation.

As such, the described system may be used to minimize steering column mass and structural complexity while meeting required steering column NVH and stiffness performance, and the use of the described damper seal may be more cost efficient than introduction of a third bearing.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering column assembly comprising:
a tubular upper jacket having a first end and a second end;
a steering shaft at least partially disposed within the tubular upper jacket;
an elastic vibration damper disposed between and in contact with the steering shaft and the tubular upper jacket, the elastic vibration damper is disposed between the shaft and the jacket second end; and
a first bearing disposed between the steering shaft and the jacket first end.

2. The assembly of claim 1, further comprising:
a lower jacket disposed about at least a portion of the steering shaft; and
a second bearing disposed between the steering shaft and the lower jacket.

3. The assembly of claim 2, wherein the only bearings included in the assembly are the first and second bearing.

4. The assembly of claim 1, wherein the elastic vibration damper comprises a carrier portion and an elastic seal portion.

5. The assembly of claim 4, wherein the seal portion comprises at least one sealing lip configured to seal against the steering shaft.

6. A steering column assembly, comprising:
a tubular upper jacket having a first end and a second end;
a steering shaft at least partially disposed within the tubular upper jacket; and
an elastic vibration damper disposed between and in contact with the steering shaft and the tubular upper jacket, the elastic vibration damper comprises a carrier portion and an elastic seal portion that comprises at least one sealing lip configured to seal against the steering shaft, wherein the seal portion comprises a dust lip configured to facilitate preventing debris or contaminates from migration in the assembly.

7. The assembly of claim 6, further comprising a biasing mechanism seated in the seal portion, the biasing mechanism configured to bias the at least one sealing lip against the steering shaft.

8. A steering column assembly comprising:
a tubular upper jacket having a first end and a second end;
a steering shaft at least partially disposed within the tubular upper jacket; and
a non-bearing compliant structural member disposed between and in contact with the steering shaft and the tubular upper jacket and disposed between the shaft and the jacket second end, the non-bearing compliant structural member configured to adjust a turning torque of the steering column assembly;
a lower jacket disposed about at least a portion of the steering shaft;
a first bearing disposed between the steering shaft and the jacket first end; and
a second bearing disposed between the steering shaft and the lower jacket.

9. The assembly of claim 8, wherein the non-bearing compliant structural member comprises a carrier portion and an elastic seal portion.

10. The assembly of claim 9, wherein the seal portion comprises at least one sealing lip configured to seal against the steering shaft.

11. The assembly of claim 10, wherein the seal portion comprises a dust lip configured to facilitate preventing debris or contaminates from migration in the assembly.

12. The assembly of claim 10, further comprising a biasing mechanism seated in the seal portion, the biasing mechanism configured to bias the at least one sealing lip against the steering shaft.

* * * * *